US011260768B2

(12) United States Patent
Tsukamoto

(10) Patent No.: US 11,260,768 B2
(45) Date of Patent: Mar. 1, 2022

(54) VEHICLE AND METHOD OF CHARGING VEHICLE

(71) Applicant: TOYOTA JIDOSHA KABUSHIKI KAISHA, Toyota (JP)

(72) Inventor: Shota Tsukamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 16/375,347

(22) Filed: Apr. 4, 2019

(65) Prior Publication Data

US 2019/0308519 A1 Oct. 10, 2019

(30) Foreign Application Priority Data

Apr. 6, 2018 (JP) .............................. JP2018-073640

(51) Int. Cl.
*B60L 53/302* (2019.01)
*B60L 53/30* (2019.01)
*B60L 53/36* (2019.01)
*B60L 53/16* (2019.01)
*B60L 53/65* (2019.01)
*B60K 1/04* (2019.01)
*B60L 53/62* (2019.01)
*B60L 53/66* (2019.01)

(52) U.S. Cl.
CPC .............. *B60L 53/302* (2019.02); *B60K 1/04* (2013.01); *B60L 53/16* (2019.02); *B60L 53/305* (2019.02); *B60L 53/36* (2019.02); *B60L 53/62* (2019.02); *B60L 53/65* (2019.02); *B60L 53/66* (2019.02); *B60L 2240/10* (2013.01)

(58) Field of Classification Search
CPC ........ B60L 53/302; B60L 53/65; B60L 53/66; B60L 53/14; B60L 2240/72
See application file for complete search history.

(56) References Cited

U.S. PATENT DOCUMENTS

| | | | |
|---|---|---|---|
| 2011/0106329 A1* | 5/2011 | Donnelly | ................ B60L 53/65 700/291 |
| 2015/0123619 A1* | 5/2015 | Marathe | ................ B60L 53/665 320/137 |
| 2019/0047429 A1* | 2/2019 | Torkelson | ........... H01M 10/486 |

FOREIGN PATENT DOCUMENTS

JP 2015-233366 A 12/2015

* cited by examiner

*Primary Examiner* — David V Henze-Gongola
(74) *Attorney, Agent, or Firm* — Sughrue Mion, PLLC

(57) ABSTRACT

A vehicle is configured to perform plug-in charging for charging a battery mounted in the vehicle with electric power supplied through a charging cable from a charging stand. The vehicle includes: an inlet to which a connector of the charging cable is connectable; and an ECU configured to control a supply current from the charging stand such that the supply current does not exceed a maximum allowable current. The ECU is configured to obtain specific information as to whether or not the charging stand is provided with a cooling mechanism for cooling the connector and the inlet. The ECU is configured to set the maximum allowable current to be higher when the charging stand is provided with the cooling mechanism than when the charging stand is not provided with the cooling mechanism.

7 Claims, 7 Drawing Sheets

FIG.4

TBL1

| INSTALLATION POSITION OF CHARGING STAND | COOLING MECHANISM |
|---|---|
| ⋮ | ⋮ |
|  | PROVIDED |
|  | NOT PROVIDED |
|  | NOT PROVIDED |
|  | PROVIDED |
|  | PROVIDED |
|  | NOT PROVIDED |
| ⋮ | ⋮ |

FIG.5

INFO

| CHARGER ID | INSTALLATION POSITION | CHARGING STANDARDS | FEE FOR CHARGING | COOLING MECHANISM |
|---|---|---|---|---|
| ⋮ | ⋮ | ⋮ | ⋮ |  |
|  |  |  |  | PROVIDED |
|  |  |  |  | NOT PROVIDED |
|  |  |  |  | NOT PROVIDED |
|  |  |  |  | PROVIDED |
|  |  |  |  | PROVIDED |
|  |  |  |  | NOT PROVIDED |
| ⋮ | ⋮ | ⋮ | ⋮ |  |

| TB | SOC | | | | |
|---|---|---|---|---|---|
| | | S1 | S2 | ... | Sn | ... |
| | T1 | | | | | |
| | T2 | | | | | |
| | ⋮ | | | | | |
| | Tm | | | | I(m,n) | |
| | ⋮ | | | | | |
| | | | | | | |

MP2

| TB | SOC | | | | |
|---|---|---|---|---|---|
| | | S1 | S2 | ... | Sn | ... |
| | T1 | | | | | |
| | T2 | | | | | |
| | ⋮ | | | | | |
| | Tm | | | | J(m,n) | |
| | ⋮ | | | | | |
| | | | | | | |

TBL2

| CHARGER ID | TYPE | COOLING MECHANISM |
|---|---|---|
| ⋮ | ⋮ | ⋮ |
|  |  | PROVIDED |
|  |  | NOT PROVIDED |
|  |  | NOT PROVIDED |
|  |  | PROVIDED |
|  |  | PROVIDED |
|  |  | NOT PROVIDED |
| ⋮ | ⋮ | ⋮ |

VEHICLE AND METHOD OF CHARGING VEHICLE

This nonprovisional application is based on Japanese Patent Application No. 2018-073640 filed on Apr. 6, 2018 with the Japan Patent Office, the entire contents of which are hereby incorporated by reference.

BACKGROUND

Field

The present disclosure relates to a vehicle and a method of charging the vehicle, and more particularly to a technique for charging a power storage device mounted in a vehicle with electric power supplied through a charging cable from a charging facility external to the vehicle.

Description of the Background Art

In recent years, there has been advancement of developing an electrically powered vehicle configured to allow "plug-in charging" for charging a power storage device mounted in a vehicle with electric power supplied through a charging cable from a charging facility (a charging stand and the like) external to the vehicle. Plug-in charging generally causes heat loss in a charging facility, a charging cable, and a charging inlet of a vehicle. Accordingly, the technique for protecting these components from excessive temperature rise has been proposed.

For example, a power supply device of a vehicle disclosed in Japanese Patent Laying-Open No. 2015-233366 is configured to receive, from outside the vehicle, the information as to whether or not the temperature of the charging cable or the charging facility (the power feeding device in Japanese Patent Laying-Open No. 2015-233366) external to the vehicle may exceed the heatproof temperature. Then, when there is a possibility that the temperature of the power feeding device or the charging cable may exceed the heatproof temperature, the power supply device limits the charging power of the charger mounted in the vehicle.

SUMMARY

Plug-in charging causes heat loss (Joule heat) in a portion of contact between the connector provided at the end of the charging cable and the inlet on the vehicle side (hereinafter abbreviated as a "contact portion"), which leads to a particular concern that the temperature at the contact portion may excessively rise. On the other hand, it is also desired to shorten the charging time for improving the user's convenience. The charging time is shortened by increasing the charging power. However, when the charging power (more specifically, the current supplied from a charging facility) is increased, the heat loss occurring in the contact portion is also increased accordingly, which leads to a further concern that the contact portion may be overheated. Thus, it is required to shorten the charging time as much as possible while appropriately protecting the charging cable and the inlet.

From the above-described point of view, it is conceivable to provide a cooling mechanism in the charging facility and the charging cable (which will be collectively also referred to as a "charging facility") when the charging facility and the charging cable are integrally formed. More specifically, by a cooling mechanism in which a coolant circulates between the charging facility and the connector of the charging cable (the so-called water-cooled cooling mechanism), the connector of the charging cable and the inlet can be cooled. As a result, overheating of the contact portion can be suppressed, so that the charging cable and the inlet can be appropriately protected.

The present inventor has focused attention on the possibility that the following problems may occur when the cooling mechanism is disposed as described above. A charging facility provided with a cooling mechanism and a charging facility not provided with a cooling mechanism are to be mixedly distributed in the market. Assuming that the same charging mode is set for the power storage device irrespective of whether the charging facility is provided with a cooling mechanism or not, and when the charging mode is set based on the charging facility not provided with a cooling mechanism, the charging power from the charging facility provided with a cooling mechanism is small, which may prevent the charging time from being sufficiently shortened. On the other hand, when the charging mode is set based on the charging facility provided with a cooling mechanism, the charging power from the charging facility not provided with a cooling mechanism is excessively increased, which may prevent sufficient protection of the charging facility. Accordingly, it is desirable to change the charging mode for the power storage device depending on whether the charging facility is provided with a cooling mechanism or not.

The present disclosure has been made to solve the above-described problems. An object of the present disclosure is to perform plug-in charging in a charging time shortened as much as possible while appropriately protecting a charging cable and an inlet.

(1) A vehicle according to an aspect of the present disclosure is configured to perform plug-in charging for charging a power storage device mounted in the vehicle with electric power supplied through a charging cable from a charging facility external to the vehicle. The vehicle includes: an inlet to which a connector of the charging cable is connectable; and a controller configured to control a supply current from the charging facility such that the supply current does not exceed a maximum allowable current. The controller is configured to obtain information related to whether or not the charging facility is provided with a cooling mechanism for cooling the connector and the inlet (which will be hereinafter also referred to as "specific information"). The controller is configured to set the maximum allowable current to be higher when the charging facility is provided with the cooling mechanism than when the charging facility is not provided with the cooling mechanism.

(2) The specific information contains: information for specifying the charging facility; and information as to whether or not the charging facility specified is provided with the cooling mechanism, which are associated with each other.

According to the configuration in the above-described (1) and (2), the maximum allowable current is set to be higher when the charging facility is provided with the cooling mechanism than when the charging facility is not provided with the cooling mechanism. Thereby, in the charging facility provided with a cooling mechanism, a relatively high maximum allowable current is set, so that the charging time can be shortened. On the other hand, in the charging facility not provided with a cooling mechanism in a charging stand, the maximum allowable current is limited to a relatively small value, so that the charging cable and the inlet can be reliably protected. Accordingly, the charging time can be shortened as much as possible while appropriately protecting the charging cable and the inlet.

(3) The vehicle further includes a memory in which the specific information is stored. The controller is configured to refer to the memory to obtain the specific information.

According to the configuration in the above-described (3), the specific information can be obtained by referring to the memory. Thus, for example, the communication with the outside of the vehicle for obtaining the specific information can be eliminated.

(4) The vehicle further includes a communication device configured to communicate with at least one of another vehicle and a server that is provided outside the vehicle. The controller is configured to obtain the specific information through communication using the communication device.

According to the configuration in the above-described (4), even when the specific information stored in the memory does not include the information about the charging facility, the specific information can be obtained from another vehicle or a server that are external to the vehicle.

(5) The vehicle further includes a positional information obtaining device configured to obtain positional information about the vehicle. The controller is configured to specify the charging facility by obtaining the positional information about the vehicle that is connected to the charging facility through the charging cable.

(6) The controller is configured to specify the charging facility by obtaining at least one of identification information about the charging facility and information showing a type of the charging facility through communication with the charging facility via the charging cable.

According to the configuration in the above-described (5), in the state where the vehicle and the charging facility are connected to each other through the charging cable, the position of the vehicle and the positional information about the charging facility are approximately the same. Thus, the charging facility can be specified by the positional information about the vehicle. Alternatively, as in the configuration in the above-described (6), the charging facility can also be specified by at least one of the identification information about the charging facility and the information showing the type of the charging facility.

(7) A method of charging a vehicle according to an aspect of the present disclosure is to perform plug-in charging for a power storage device mounted in the vehicle with electric power supplied through a charging cable from a charging facility external to the vehicle. The vehicle includes an inlet to which a connector of the charging cable is connectable. The method of charging a vehicle includes the first, second and third steps. The first step is for obtaining information related to whether or not the charging facility is provided with a cooling mechanism configured to cool the connector and the inlet (specific information). The second step is for determining based on the specific information whether the charging facility is provided with the cooling mechanism or not. The third step is for setting a maximum allowable value of a current supplied from the charging facility through the charging cable to be higher when the charging facility is provided with the cooling mechanism than when the charging facility is not provided with the cooling mechanism.

According to the method in the above-described (7), the charging time can be shortened as much as possible while appropriately protecting the charging cable and the inlet as in the configuration in the above-described (1).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram showing an example of a charging table in the first embodiment.

FIG. 5 is a diagram showing an example of charger information stored in a charger information database in a server.

FIG. 6 is a diagram showing an example of two maps.

FIG. 8 is a diagram showing an example of a charging table in the second embodiment.

DESCRIPTION OF THE PREFERRED EMBODIMENTS

Figure 1:
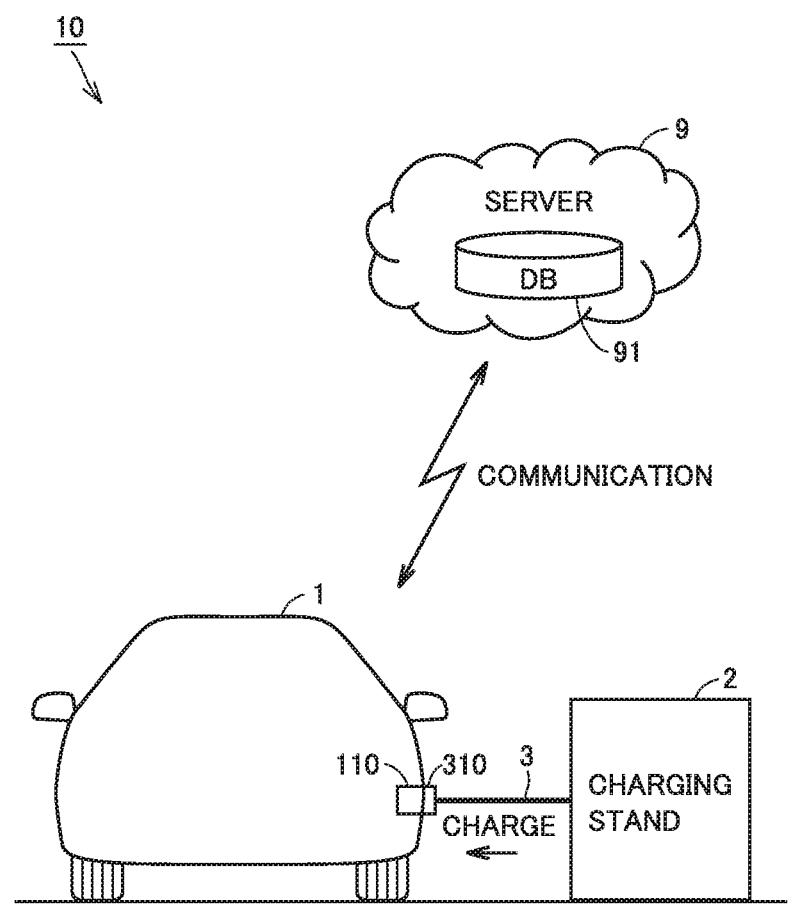
FIG. 1 is a diagram schematically showing the entire configuration of a charging system according to the first embodiment of the present disclosure.

Embodiments of the present disclosure will be hereinafter described in detail with reference to the accompanying drawings, in which the same or corresponding components are designated by the same reference characters, and the description thereof will not be repeated.

First Embodiment

<Entire Configuration of Charging System>

FIG. 1 is a diagram schematically showing the entire configuration of a charging system according to the first embodiment of the present disclosure. Referring to FIG. 1, a charging system 10 includes a vehicle 1, a charging stand 2, a charging cable 3, and a server 9.

Vehicle 1 and charging stand 2 are configured to be electrically connectable to each other through charging cable 3. Vehicle 1 is a user's (not shown) vehicle, and may be a plug-in hybrid vehicle, for example. Vehicle 1 may be an electric vehicle as long as it is configured to allow plug-in charging.

FIG. 1 shows the state where plug-in charging is performed for vehicle 1 by charging stand 2. Charging stand 2 is a public charging stand (or a charging station), for example. Thus, plug-in charging by charging stand 2 may be performed for a vehicle (not shown) other than vehicle 1. Furthermore, plug-in charging for vehicle 1 may be performed by a charging stand (not shown) other than charging stand 2 shown in FIG. 1.

Vehicle 1 and server 9 are configured to wirelessly communicate with each other (bidirectional communication). Although not shown, wireless communication between another vehicle (not shown) and server 9 can also be established.

Server 9 includes a central processing unit (CPU), a memory, and an input/output port, each of which is not shown. Server 9 may be partially or entirely configured to perform a computing process by software or configured to perform a computing process by hardware such as an electronic circuit. Server 9 includes a charger information database 91 storing information about a large number of charging stands including charging stand 2 shown in FIG. 1 (charger information INFO). The details of charger information INFO will be described later (see FIG. 5).

Figure 2:
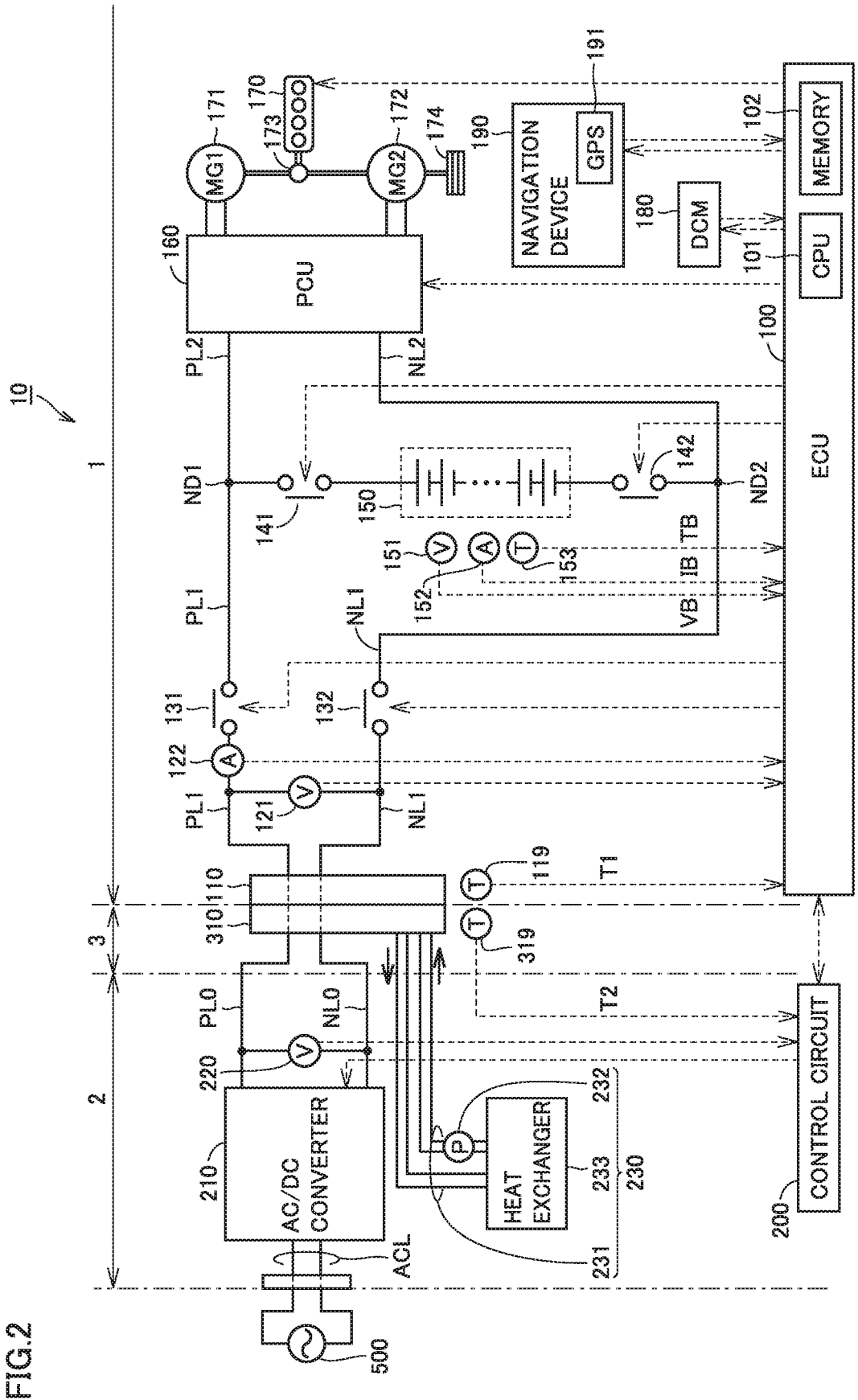
FIG. 2 is a block diagram schematically showing the configuration of a vehicle, a charging stand and a charging cable according to the first embodiment.

FIG. 2 is a block diagram schematically showing the configuration of vehicle 1, charging stand 2 and charging cable 3 according to the first embodiment. Referring to FIG. 2, charging stand 2 is provided as a charger for direct current (DC) charging, for example, and configured to convert alternating-current (AC) power from a system power supply 500 into DC power and supply the converted DC power so as to charge battery 150 mounted in vehicle 1. Charging stand 2 includes a power line ACL, an AC/DC converter 210, a voltage sensor 220, power feed lines PL0 and NL0, a cooling mechanism 230, and a control circuit 200. Cooling mechanism 230 includes a circulation path 231, a water pump 232, and a heat exchanger 233.

Power line ACL is electrically connected to system power supply 500. Through power line ACL, AC power is transmitted from system power supply 500 to AC/DC converter 210.

AC/DC converter 210 converts the AC power on power line ACL into DC power for charging battery 150 mounted in vehicle 1. Power conversion by AC/DC converter 210 may be performed by the combination of AC/DC conversion for power factor improvement and DC/DC conversion for voltage level adjustment. The DC power output from AC/DC converter 210 is supplied through power feed line PL0 on the positive electrode side and power feed line NL0 on the negative electrode side.

Voltage sensor 220 is provided between power feed lines PL0 and NL0. Voltage sensor 220 detects a voltage between power feed lines PL0 and NL0, and outputs the detection result to control circuit 200.

According to the instruction from control circuit 200, water pump 232 causes a coolant (cooling water) enclosed inside circulation path 231 to circulate between heat exchanger 233 and a connector 310 of charging cable 3. Thereby, the contact portion between connector 310 and inlet 110 (the region where the terminals are in contact with each other) can be cooled.

Heat exchanger 233 is configured to include a heat transfer tube and a heat dissipation fin (not shown), for example. In heat exchanger 233, the heat of the coolant inside circulation path 231 is dissipated to the surrounding ambient air.

The configuration of cooling mechanism 230 is not limited to the water-cooled configuration as described above, but may be an air-cooled configuration, for example. Alternatively, examples of the cooling mechanism may be a heat pump system or may be a thermoelectric cooling system including a Peltier device.

Control circuit 200 is configured to include a CPU, a memory and an input/output port (each of which is not shown). Based on the voltage detected by voltage sensor 220, various switches, the signal from vehicle 1, and the map and the program stored in the memory, control circuit 200 controls the power conversion operation performed by AC/DC converter 210. Furthermore, control circuit 200 controls the cooling operation by water pump 232 based on various signals and the program that is stored in the memory.

Furthermore, connector 310 of charging cable 3 is provided with a temperature sensor 319 configured to detect a temperature T2 of connector 310. Upon reception of the signal showing temperature T2 from temperature sensor 319, control circuit 200 can conduct a diagnosis as to whether an abnormality occurs or not in connector 310 (more specifically, whether the contact portion between connector 310 and inlet 110 is overheated or not).

Vehicle 1 includes an inlet 110, charge lines PL1, NL1, a voltage sensor 121, a current sensor 122, vehicle contactors 131, 132, system main relays 141, 142, a battery 150, power lines PL2, NL2, a power control unit (PCU) 160, an engine 170, motor generators 171, 172, a power split device 173, a driving wheel 174, a communication module 180, and an electronic control unit (ECU) 100.

Inlet (also referred to as a charging port) 110 is configured such that connector 310 of charging cable 3 is electrically connectable thereto. More specifically, connector 310 is inserted into inlet 110 through mechanical coupling such as fitting, thereby ensuring electrical connection between power feed line PL0 and the contact of inlet 110 on the positive electrode side while ensuring electrical connection between power feed line NL0 and the contact of inlet 110 on the negative electrode side. Furthermore, inlet 110 and connector 310 are connected to each other through the charging cable, so that ECU 100 in vehicle 1 and control circuit 200 in charging stand 2 can transmit and receive various signals, instructions and information (data) to and from each other through communication according to prescribed communication standards such as CAN (Controller Area Network) or through communication of an analog signal via an analog control line.

Furthermore, inlet 110 is provided with a temperature sensor 119 for detecting a temperature T1 in inlet 110, as with connector 310 of charging cable 3. Upon reception of the signal showing temperature T1 from temperature sensor 119, ECU 100 can conduct a diagnosis as to whether abnormalities such as overheating occur or not in inlet 110.

Voltage sensor 121 is provided between charge line PL1 and charge line NL1 so as to be located closer to inlet 110 with respect to vehicle contactors 131 and 132. Voltage sensor 121 detects the DC voltage between charge lines PL1 and NL1, and outputs the detection result to ECU 100. Current sensor 122 is provided in charge line PL1. Current sensor 122 detects the current flowing through charge line PL1, and outputs the detection result to ECU 100. Based on the detection results by voltage sensor 121 and current sensor 122, ECU 100 can calculate the electric power supplied from charging stand 2.

Vehicle contactor 131 is connected to charge line PL1 while vehicle contactor 132 is connected to charge line NL1. Vehicle contactors 131 and 132 are controlled to be closed/opened according to the instruction from ECU 100. In the state where vehicle contactors 131 and 132 are closed while system main relays 141 and 142 are closed, power can be transferred between inlet 110 and battery 150.

Battery 150 supplies electric power for generating the driving force of vehicle 1. Furthermore, battery 150 stores the electric power generated by motor generators 171 and 172. Battery 150 is an assembled battery configured to include a plurality of cells (not shown). Each of the plurality of cells is a secondary battery such as a lithium-ion secondary battery or a nickel-metal hydride secondary battery. Since the internal configuration of the assembled battery is not particularly limited in the present embodiment, each cell will not be hereinafter particularly mentioned but will be merely described as battery 150. Battery 150 may be a capacitor such as an electric double layer capacitor. Battery 150 corresponds to the "power storage device" according to the present disclosure.

Battery 150 has a positive electrode electrically connected to a node ND1 through system main relay 141. Node ND1 is electrically connected to charge line PL1 and power line PL2. Similarly, battery 150 has a negative electrode electrically connected to a node ND2 through system main relay 142. Node ND2 is electrically connected to charge line NL1 and power line NL2. System main relays 141 and 142 are controlled to be closed/opened according to the instruction from ECU 100.

Battery 150 includes a voltage sensor 151, a current sensor 152, and a temperature sensor 153. Voltage sensor 151 detects a voltage VB on battery 150. Current sensor 152 detects a current IB input into and output from battery 150. Temperature sensor 153 detects a temperature TB of battery 150. The sensors output their detection results to ECU 100. Based on the detection results from these sensors, ECU 100 can estimate a state of charge (SOC) of battery 150, for example.

PCU 160 is electrically connected between power lines PL2, NL2 and motor generators 171, 172. PCU 160 is configured to include a converter and an inverter (each of which is not shown) and to perform bidirectional power conversion between battery 150 and motor generators 171, 172 while system main relays 141 and 142 are closed.

Engine 170 is an internal combustion engine such as a gasoline engine and configured to generate the driving force for causing vehicle 1 to travel according to the control signal from ECU 300.

Each of motor generators 171 and 172 is a three-phase AC rotating electric machine, for example. Motor generator 171 is coupled to a crankshaft of engine 170 through power split device 173. When starting engine 170, motor generator 171 rotates the crankshaft of engine 170 using the electric power from battery 150. Furthermore, motor generator 171 can also generate electric power using the motive power from engine 170. The AC power generated by motor generator 171 is converted into DC power by PCU 160, and supplied to battery 150. Also, the AC power generated by motor generator 171 may be supplied to motor generator 172.

Motor generator 172 rotates the drive shaft using at least one of the electric power from battery 150 and the electric power generated by motor generator 171. Motor generator 172 can also generate electric power by regenerative braking. The AC power generated by motor generator 172 is converted into DC power by PCU 160 and supplied to battery 150.

Power split device 173 is a planetary gear mechanism, for example, and mechanically couples three elements including the crankshaft of engine 170, the rotation shaft of motor generator 171 and the drive shaft.

Communication module 180 serves as a digital communication module (DCM) configured to wirelessly communicate with server 9. Communication module 180 corresponds to the "communication device" according to the present disclosure.

A navigation device 190 includes a global positioning system (GPS) receiver 191 configured to specify the position of vehicle 1 based on the radio wave from an artificial satellite (not shown). Navigation device 190 performs various navigation processes for vehicle 1 using the positional information about vehicle 1 specified by GPS receiver 191 (GPS information). More specifically, based on the GPS information about vehicle 1 and the road map data stored in the memory (not shown), navigation device 190 calculates a recommendable route from the current position of vehicle 1 to its destination, and outputs the information of the calculated recommendable route to ECU 100.

ECU 100 is configured to include: a CPU 101; a memory 102 such as a read only memory (ROM) and a random access memory (RAM); and an input/output port (not shown), as in control circuit 200. In response to the signal from each sensor, ECU 100 controls devices so as to bring vehicle 1 into a desired state.

Examples of main control performed by ECU 100 include plug-in charging control for charging battery 150 mounted in a vehicle with the electric power supplied from charging stand 2. Plug-in charging control is advanced in response to transmission and reception of signals, instructions and information between ECU 100 of vehicle 1 and control circuit 200 of charging stand 2 through charging cable 3. In plug-in charging control, the power conversion operation by AC/DC converter 210 is controlled such that the current supplied from charging stand 2 to vehicle 1 through charging cable 3 does not exceed the "maximum allowable current" corresponding to the maximum allowable value of the current.

Furthermore, a charging table TBL1 used for plug-in charging control is stored in memory 102 of ECU 100. Charging table TBL1 will be described later (see FIG. 4).

<Protection of Charging Device and Shortening of Charging Time>

For plug-in charging, it is desired to shorten the charging time in order to improve the user's convenience. The charging time is shortened by increasing the charging power supplied from the charging stand. However, during plug-in charging, Joule heat represented by a value obtained by multiplying the resistance value of the contact portion by the square of the current value is produced as heat loss in the contact portion between the connector of the charging cable and the inlet on the vehicle side (the contact between the connector terminal and the inlet terminal). Accordingly, when the supply current from the charging stand is increased in order to increase the charging power, heat loss is also increased accordingly, which leads to a further concern that the contact portion may be overheated. Thus, it is required to shorten the charging time as much as possible while appropriately protecting the connector of the charging cable and the inlet.

In the market, there are charging stands each provided with cooling mechanism 230 (circulation path 231, water pump 232 and heat exchanger 233) as shown in FIG. 2 while there are also charging stands (not shown) each not provided with cooling mechanism 230. Thus, in the market environment in which various charging stands mixedly exist, assuming that the same charging mode is set for battery 150 irrespective of whether the charging stand is provided with cooling mechanism 230 or not, and when the charging mode is set based on the charging stand not provided with cooling mechanism 230, the charging power from the charging stand provided with cooling mechanism 230 is small. This may prevent the charging time from being sufficiently shortened. On the other hand, when the charging mode is set based on the charging stand provided with cooling mechanism 230, the charging power from the charging stand not provided with cooling mechanism 230 is excessively large. This may prevent sufficient protection of the connector of the charging cable and the inlet.

Accordingly, in the present embodiment, the charging mode of battery 150 is changed depending on whether the charging stand is provided with cooling mechanism 230 or not. More specifically, the maximum allowable current (maximum allowable currents I and J described later) is set to be larger when the charging stand is provided with cooling mechanism 230 than when the charging stand is not provided with cooling mechanism 230. Thereby, in the charging stand provided with cooling mechanism 230 and achieving high cooling performance, a relatively high maximum allowable current is set, so that the charging time can be shortened. On the other hand, in the charging stand not provided with cooling mechanism 230 and achieving a low cooling performance, the maximum allowable current is limited to a relatively small value, so that the charging cable and the inlet can be reliably protected. In the following, plug-in charging control in the first embodiment will be described in detail.

<Flow of Plug-in Charging>

Figure 3:
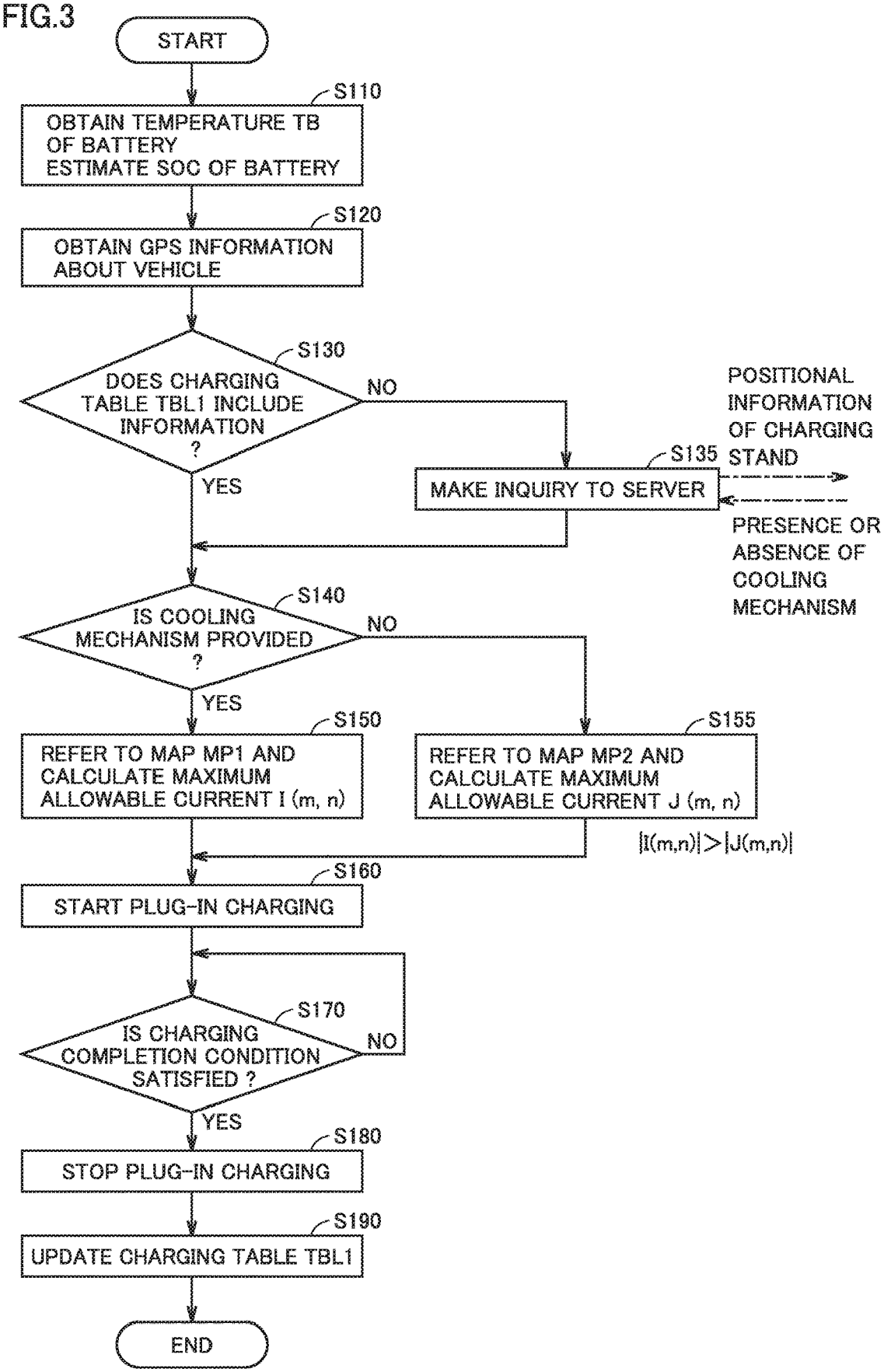
FIG. 3 is a flowchart showing plug-in charging control in the first embodiment.

FIG. 3 is a flowchart showing plug-in charging control in the first embodiment. The flowcharts shown in FIG. 3 and FIG. 7 (described later) each are performed when connector 310 of charging cable 3 is inserted into inlet 110. Each of steps (hereinafter abbreviated as "S") included in the flowchart shown in FIG. 4 is basically implemented through software processing by ECU 100, but may be implemented by dedicated hardware (an electrical circuit) fabricated in ECU 100.

Referring to FIG. 3, in S110, ECU 100 obtains temperature TB of battery 150 from temperature sensor 153 and estimates an SOC of battery 150. Examples of the method of estimating an SOC may be various types of known methods such as a method of referring to an SOC-OCV (Open Circuit Voltage) curve obtained in advance, or a current integration method.

In S120, ECU 100 obtains GPS information about vehicle 1 from navigation device 190. In addition, vehicle 1 and the charging stand (charging stand 2 in the example shown in FIG. 2) are located adjacent to each other in the state where vehicle 1 and the charging stand are connected to each other through charging cable 3. Thus, vehicle 1 and the charging stand can be regarded as being located at the approximately same position.

In S130, by referring to charging table TBL1 stored in memory 102, ECU 100 determines whether the positional information about the charging stand (that is, the GPS information about vehicle 1) is included in charging table TBL1 or not.

FIG. 4 is a diagram showing an example of charging table TBL1 in the first embodiment. As shown in FIG. 4, in charging table TBL1, the positional information about various installation positions of the charging stand where plug-in charging for vehicle 1 was performed in the past is associated with the information as to whether the charging stand is provided with cooling mechanism 230 or not. Thus, by referring to charging table TBL1, based on the positional information about the charging stand connected to vehicle 1 through the charging cable (which will be hereinafter also referred to as a "target charging stand"), it can be determined whether the target charging stand is provided with cooling mechanism 230 or not. Charging table TBL1 corresponds to the "specific information" according to the present disclosure.

Referring back to FIG. 3, when the positional information about the target charging stand is included in charging table TBL1 (YES in S130), ECU 100 causes the process to proceed to S140. On the other hand, when the positional information about the target charging stand is not included in charging table TBL1 (NO in S130), ECU 100 transmits the positional information about the target charging stand to server 9, thereby obtaining, from server 9, the information as to whether the target charging stand is provided with cooling mechanism 230 or not (S135).

FIG. 5 is a diagram showing an example of charger information INF stored in charger information database 91 in server 9. Referring to FIG. 5, charger information INFO includes, for example: a charger ID showing the identification information for the charging stand; the information about the installation position of the charging stand (positional information); the information about the charging standards applied to the charging stand; the information about the fee for charging by the charging stand; and the information as to whether the charging stand includes cooling mechanism 230 or not, which are associated with one another. Upon reception of the inquiry from ECU 100 of vehicle 1 and the positional information about the target charging stand, server 9 refers to charger information INFO to respond to the inquiry from ECU 100 as to whether the target charging stand includes cooling mechanism 230 or not.

Again referring to FIG. 3, in S140, ECU 100 determines whether the target charging stand includes cooling mechanism 230 or not. More specifically, when it is determined as YES in S130, ECU 100 refers to charging table TBL1 to determine based on the past charging history in the target charging stand whether the target charging stand includes cooling mechanism 230 or not. On the other hand, when it is determined as NO in S130, ECU 100 determines based on the response from server 9 whether the target charging stand includes cooling mechanism 230 or not.

When the target charging stand includes cooling mechanism 230 (YES in S140), ECU 100 refers to a map MP1 described later to calculate a maximum allowable current I of battery 150 (S150). On the other hand, when the target charging stand does not include cooling mechanism 230 (NO in S140), ECU 100 refers to a map MP2 to calculate a maximum allowable current J of battery 150 (S155).

In addition, charger information INFO of server 9 does not necessarily cover the information about all of the charging stations. Thus, the information about the target charging station may not be included in charger information INFO. In such a case, to ECU 100, server 9 transmits a response stating that there is no information about the target charging station. Then, ECU 100 places high importance on protection of inlet 110 and the like, and determines that the target charging stand does not include cooling mechanism 230. Thus, ECU 100 causes the process to proceed to S155, and then, refers to map MP2.

FIG. 6 is a diagram showing an example of maps MP1 and MP2. As shown in FIG. 6, map MP1 is a three-dimensional map showing three parameters including:

temperature TB of battery 150; the SOC of battery 150; and maximum allowable current I, for example. More specifically, temperature TB of battery 150 is classified into a plurality of temperature regions (indicated by T1, T2, . . . ) each having a prescribed width. The SOC of battery 150 is also similarly classified into a plurality of SOC regions (indicated by S1, S2, . . . ) each having a prescribed width. Maximum allowable current I is set for each combination of the temperature region and the SOC region that are classified. FIG. 6 shows maximum allowable current I (m, n) corresponding to the combination of a temperature region Tm and an SOC region Sn. Also in map MP2, maximum allowable current J is set for each combination of the temperature region and the SOC region as in map MP1, though not specifically described.

In view of comparison on the same temperature conditions and SOC conditions (the combination of the same temperature region Tm and the same SOC region Sn), the absolute value of maximum allowable current I (m, n) in map MP1 is larger than the absolute value of maximum allowable current J (m, n) in map MP2 ($|I(m, n)|>J (m, n)$).

The reason why each of maps MP1 and MP2 includes temperature TB and the SOC of battery 150 is because the charging capability of battery 150 (the amount of current that can be received in battery 150) has temperature dependency and SOC dependency, like a typical secondary battery. However, maps MP1 and MP2 each are not necessarily a three-dimensional map including temperature TB and the SOC, but maps MP1 and MP2 each may be a two-dimensional map including the maximum allowable current and one of temperature TB and the SOC. Alternatively, without particularly considering the charging capability of battery 150, memory 102 may store only a predetermined value of the maximum allowable current in place of maps MP1 and MP2.

Referring back to FIG. 3, ECU 100 then controls charging stand 2 to start plug-in charging for battery 150 (S160). Specifically, ECU 100 transmits the instruction to start plug-in charging through charging cable 3 to control circuit 200 in the target charging stand, thereby causing control circuit 200 to control AC/DC converter 210 so as to start power supply.

ECU 100 causes power supply to continue until the condition for completing plug-in charging is satisfied (NO in S170). Then, when the condition for completing plug-in charging is satisfied (YES in S170), ECU 100 stops power supply (S180). Satisfaction of the condition for completing plug-in charging may mean that the SOC of battery 150 reaches a specified value and battery 150 reaches a fully-charged state, or may mean that a prescribed charging end time has reached in the so-called timer charging.

ECU 100 updates charging table TBL1, for example, after power supply is stopped (S190). Specifically, when ECU 100 determines based on the response from server 9 whether the target charging stand is provided with cooling mechanism 230 or not (S135), ECU 100 adds the information about this charging stand to charging table TBL1. Although not shown, when the information about the target charging stand is already included in charging table TBL1 (determined as YES in S130), the process in S190 is skipped. The timing at which the process in S190 is performed is not particularly limited, but may be any timing in or after the process of S140.

As described above, according to the first embodiment, when the target charging stand is provided with cooling mechanism 230, maximum allowable current I is set (S150). On the other hand, when the target charging stand is not provided with cooling mechanism 230, maximum allowable current J is set (S155). On the same temperature conditions and the same SOC conditions, (the absolute value of) maximum allowable current I is greater than (the absolute value of) maximum allowable current J. Thereby, in the charging stand provided with cooling mechanism 230 (see FIG. 2), a relatively high maximum allowable current I is set, so that the charging time can be shortened. On the other hand, in the charging stand not provided with cooling mechanism 230 (not shown), relatively small maximum allowable current J is set so as to limit the supply current, thereby reducing the heat loss in the connection portion between connector 310 of charging cable 3 and inlet 110 of vehicle 1, so that the connection portion can be more reliably protected. Therefore, according to the first embodiment, for shortening the charging time and protecting charging cable 3 and vehicle 1, appropriate measures can be taken depending on whether the target charging stand is provided with cooling mechanism 230 or not.

In the explanation of the flowchart shown in FIG. 3, in the process of S135, an inquiry is given to server 9 as to whether the target charging stand is provided with cooling mechanism 230 or not. However, this inquiry may be given to vehicles (not shown) located around vehicle 1 through the so-called vehicle-to-vehicle communication. For example, the response to the above-mentioned inquiry can be obtained from another vehicle that has been plug-in charged in the target charging stand.

Second Embodiment

The first embodiment has been described with regard to an example of the configuration in which the position of the target charging stand is specified using the GPS information of vehicle 1 and the maximum allowable current is switched based on the positional information about the charging stand. However, it is not indispensable to use the positional information about the target charging stand for specifying the target charging stand. The second embodiment will be described with regard to the configuration in which the maximum allowable current is set through the communication between vehicle 1 and the target charging stand. In the second embodiment, a charging table TBL2 different from charging table TBL1 is stored in memory 102 of ECU 100. The configurations of the target charging stand and the vehicle in the second embodiment other than the configurations described above are basically the same as those shown in FIG. 2, and therefore, the description thereof will not be repeated.

Figure 7:
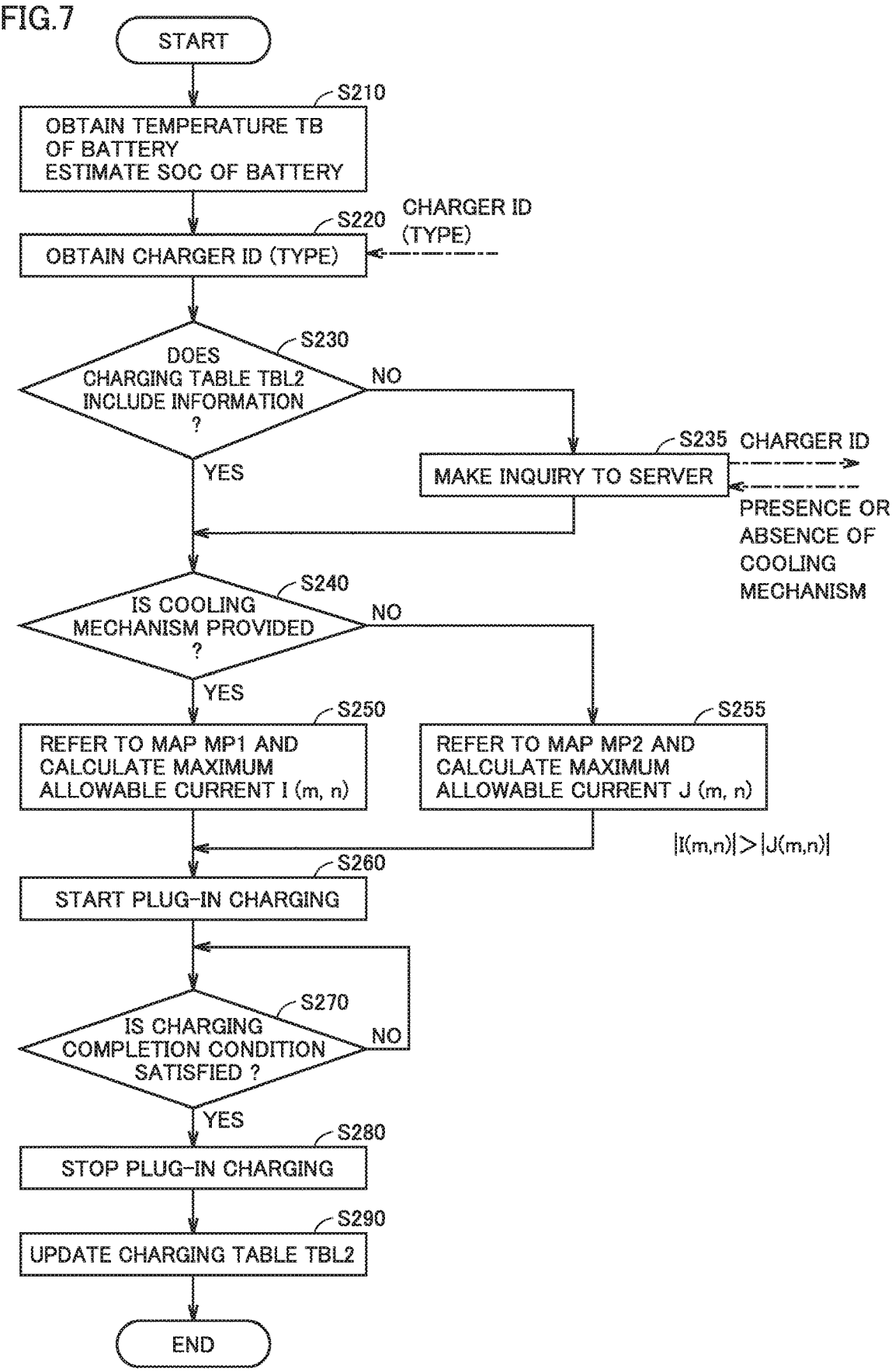
FIG. 7 is a flowchart showing plug-in charging control in the second embodiment.

FIG. 7 is a flowchart showing plug-in charging control in the second embodiment. Referring to FIG. 7, this flowchart is different from the flowchart in the first embodiment (see FIG. 3) in that it includes the processes of S220 to S235 in place of the processes of S120 to S135.

Referring to FIG. 7, ECU 100 obtains temperature TB of battery 150 from temperature sensor 153 and estimates the SOC of battery 150 (S210). Then, ECU 100 obtains a charger ID of the target charging stand through communication with the target charging stand via charging cable 3 (S220). Then, ECU 100 determines whether the charger ID of the target charging stand is included in charging table TBL2 or not (S230).

FIG. 8 is a diagram showing an example of charging table TBL2 in the second embodiment. As shown in FIG. 8, charging table TBL2 includes information about various charging stands that have been used for plug-in charging of vehicle 1 including: a charger ID; a type of the charging stand; and presence or absence of cooling mechanism 230. Thus, ECU 100 can determine based on the charger ID whether cooling mechanism 230 is included or not.

In addition, it is determined based on the type (model number) of the charging stand as to whether cooling mechanism 230 is provided or not. Accordingly, in place of the charger ID of the target charging stand, or in addition to the charger ID of the target charging stand, ECU 100 may obtain the information about the type of the target charging stand through communication, and determine based on the obtained information whether cooling mechanism 230 is provided or not.

Again referring to FIG. 7, in S230, ECU 100 refers to charging table TBL2 stored in memory 102 and determines whether the information about the charger ID (or the type of the target charging stand) is included in charging table TBL2 or not.

When the information about the charger ID of the target charging stand is not included in charging table TBL2 (NO in S230), ECU 100 transmits the charger ID to server 9 for utilizing charger information INFO shown in FIG. 5. Then, ECU 100 obtains the response from server 9 showing whether the target charging stand is provided with cooling mechanism 230 or not (S235). When the information about the charger ID of the target charging stand is included in charging table TBL2 (YES in S230), the process in S235 is skipped and the process proceeds to S240. Since the processes in or after S240 are the same as the corresponding processes in the flowchart in the first embodiment (see FIG. 3), the detailed description thereof will not be repeated.

As described above, according to the second embodiment, based on the charger ID (or the information about the type) of the target charging stand, it is determined whether the target charging stand is provided with cooling mechanism 230 or not. When the target charging stand is provided with cooling mechanism 230, maximum allowable current I is set (S250). On the other hand, when the target charging stand is not provided with cooling mechanism 230, maximum allowable current J is set (S255). In this way, also by using the charger ID (or the information about the type), the charging time can be shortened as much as possible while appropriately protecting connector 310 of charging cable 3 and inlet 110, as in the first embodiment.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle configured to perform plug-in charging for charging a power storage device mounted in the vehicle with electric power supplied through a charging cable from a charging facility external to the vehicle, the vehicle comprising:
   an inlet to which a connector of the charging cable is connectable; and
   a controller configured to:
      control a supply current from the charging facility such that the supply current does not exceed a maximum allowable current,
      determine, by obtaining specific information, whether or not the charging facility is provided with a cooling mechanism for cooling the connector and the inlet, and
      set the maximum allowable current to be higher when the charging facility is provided with the cooling mechanism than when the charging facility is not provided with the cooling mechanism.

2. The vehicle according to claim 1, wherein the specific information contains: information for specifying the charging facility; and information indicating whether or not the charging facility specified is provided with the cooling mechanism, which are associated with each other.

3. The vehicle according to claim 1, further comprising a memory in which the specific information is stored, wherein
   the controller is configured to refer to the memory to obtain the specific information.

4. The vehicle according to claim 1, further comprising a communication device configured to communicate with at least one of another vehicle and a server that is provided outside the vehicle, wherein
   the controller is configured to obtain the specific information through communication using the communication device.

5. The vehicle according to claim 1, further comprising a positional information obtaining device configured to obtain positional information about the vehicle, wherein
   the controller is configured to specify the charging facility by obtaining the positional information about the vehicle that is connected to the charging facility through the charging cable.

6. The vehicle according to claim 1, wherein the controller is configured to specify the charging facility by obtaining at least one of identification information about the charging facility and information showing a type of the charging facility through communication with the charging facility via the charging cable.

7. A method of charging a vehicle for performing plug-in charging for a power storage device mounted in the vehicle with electric power supplied through a charging cable from a charging facility external to the vehicle,
   the vehicle including an inlet to which a connector of the charging cable is connectable, the method of charging a vehicle comprising:
   obtaining specific information as to which indicates at least whether or not the charging facility is provided with a cooling mechanism configured to cool the connector and the inlet;
   determining based on the specific information whether the charging facility is provided with the cooling mechanism or not; and
   setting a maximum allowable value of a current supplied from the charging facility through the charging cable to be higher when the charging facility is provided with the cooling mechanism than when the charging facility is not provided with the cooling mechanism.

* * * * *